US010360023B2

(12) United States Patent
Cowan et al.

(10) Patent No.: US 10,360,023 B2
(45) Date of Patent: Jul. 23, 2019

(54) SOURCE CODE REVISION CONTROL WITH SELECTABLE FILE PORTION SYNCHRONIZATION

(71) Applicant: International Business Machines Corporation, Armonk, NY (US)

(72) Inventors: Scott D. Cowan, Ottawa (CA); Evan C. Hughes, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 15/046,074

(22) Filed: Feb. 17, 2016

(65) Prior Publication Data

US 2017/0235568 A1    Aug. 17, 2017

(51) Int. Cl.
G06F 9/44     (2018.01)
G06F 8/71     (2018.01)
G06F 8/73     (2018.01)

(52) U.S. Cl.
CPC . *G06F 8/71* (2013.01); *G06F 8/73* (2013.01)

(58) Field of Classification Search
CPC .............. G06F 8/71; G06F 8/73; G06F 8/20
See application file for complete search history.

(56) References Cited

U.S. PATENT DOCUMENTS

| 7,041,934 | B2 * | 5/2006 | Lee ..................... | B23K 11/258 |
| | | | | 219/113 |
| 7,131,112 | B1 * | 10/2006 | Bartz ...................... | G06F 8/71 |
| | | | | 717/122 |
| 8,683,430 | B2 | 3/2014 | Gonzales et al. | |
| 8,863,087 | B2 * | 10/2014 | Braverman ........... | G06F 11/368 |
| | | | | 717/124 |
| 9,229,693 | B1 * | 1/2016 | Batni ..................... | G06F 8/71 |
| 9,361,096 | B1 * | 6/2016 | Bienkowski ............ | G06F 8/73 |
| 9,483,259 | B1 * | 11/2016 | Lee ...................... | G06F 8/71 |
| 9,575,764 | B1 * | 2/2017 | Turner .................... | G06F 8/71 |
| 9,836,383 | B1 * | 12/2017 | Baars ..................... | G06F 8/70 |
| 2002/0116702 | A1 * | 8/2002 | Aptus .................... | G06F 8/20 |
| | | | | 717/170 |

(Continued)

OTHER PUBLICATIONS

Trabelsi, "How to Use Git Source Control with Xcode in iOS6," Mtrabelsi, Retrieved from <http://www.raywenderlich.com/13771/how-to-use-git-source-control-with-xcode-in-ios-6> Nov. 14, 2012, 39 pgs.

(Continued)

*Primary Examiner* — Wei Y Zhen
*Assistant Examiner* — Brahim Bourzik
(74) *Attorney, Agent, or Firm* — Shumaker & Sieffert, P.A.

(57) ABSTRACT

Techniques are described for version control with selectable file portion synchronization between an IDE and a repository, so that a version control system of this disclosure either synchronizes or ignores different portions of a file during synchronization, in accordance with user selections. In one example, a method includes evaluating content entered into a file. The method further includes detecting a starting delimiter and a stopping delimiter in the file. The method further includes copying a first portion of the file outside the starting delimiter and the stopping delimiter to a repository, and refraining from copying a second portion of the file inside the starting delimiter and the stopping delimiter to the repository.

15 Claims, 7 Drawing Sheets

(56) References Cited

U.S. PATENT DOCUMENTS

| | | | | |
|---|---|---|---|---|
| 2006/0112376 A1* | 5/2006 | Broberg | ............... | G06F 8/20 |
| | | | | 717/136 |
| 2007/0136394 A1* | 6/2007 | Cowan | ............... | G06F 17/2288 |
| 2009/0271779 A1* | 10/2009 | Clark | ............... | G06F 8/71 |
| | | | | 717/171 |
| 2011/0153746 A1* | 6/2011 | Callanan | ............... | G06F 17/30165 |
| | | | | 709/205 |
| 2012/0324446 A1* | 12/2012 | Fries | ............... | G06F 21/64 |
| | | | | 718/1 |
| 2013/0036400 A1* | 2/2013 | Bak | ............... | G06F 8/71 |
| | | | | 717/101 |
| 2013/0110974 A1* | 5/2013 | Arrasvuori | ............... | H04L 67/18 |
| | | | | 709/217 |
| 2014/0201141 A1* | 7/2014 | Vibhor | ............... | H04L 29/0854 |
| | | | | 707/622 |
| 2015/0106790 A1* | 4/2015 | Bigwood | ............... | G06F 11/3624 |
| | | | | 717/127 |
| 2015/0339113 A1* | 11/2015 | Dorman | ............... | H04L 63/123 |
| | | | | 717/169 |
| 2017/0109179 A1* | 4/2017 | Hughes | ............... | G06F 3/04842 |

OTHER PUBLICATIONS

Collins-Sussman et al., "Advanced Merging," Creative Commons Attribution License v2.0, Retrieved from <http://svnbook.red-bean.com/en/1.6/svn.branchmerge.advanced.html> on Feb. 17, 2016, 14 pgs.

Wikipedia, "Cryptographic hash function," Wikipedia, Retrieved from <https://en.wikipedia.org/wiki/Cryptographic_hash_function> on Jul. 22, 2015, 8 pgs.

IBM, "Selecting resources to exclude from Rational Team Concert source control," IBM Knowledge Center, Retrieved from <http://www-01.ibm.com/support/knowledgecenter/SSYMRC_4.0.0/com.ibm.team.scm.doc/topics/t_scm_eclipse_ignore.html> on Feb. 17, 2016, 1 pg.

Git, "Git—fast-version-control," Git, Retrieved from <https://git-scm.com/docs/gitignore> on Feb. 17, 2016, 7 pgs.

* cited by examiner

SOURCE CODE REVISION CONTROL WITH SELECTABLE FILE PORTION SYNCHRONIZATION

TECHNICAL FIELD

This disclosure relates to software development tools.

BACKGROUND

An Integrated Development Environment (IDE) may include access to a variety of tools to facilitate tasks involved in writing, modifying, and developing software. A revision control system or version control system such as Jazz™ or Git™ may automatically manage file synchronization and version archiving functions. A version control system may help enable source code files to be highly configurable. Often, the quickest way to modify software during development and testing may be to modify source code files, or content within a file (e.g., defined constant values). The version control system may record the modifications and the different versions of the files in a repository.

SUMMARY

In one aspect of the invention, a method includes evaluating content entered into a file. The method further includes detecting a starting delimiter and a stopping delimiter in the file. The method further includes copying a first portion of the file outside the starting delimiter and the stopping delimiter to a repository, and refraining from copying a second portion of the file inside the starting delimiter and the stopping delimiter to the repository.

In another aspect, a computer program product includes a computer-readable storage medium having program code embodied therewith. The program code is executable by a computing device to evaluate content entered into a file. The program code is further executable by a computing device to detect a starting delimiter and a stopping delimiter in the file. The program code is further executable by a computing device to copy a first portion of the file outside the starting delimiter and the stopping delimiter to a repository, and refrain from copying a second portion of the file inside the starting delimiter and the stopping delimiter to the repository.

In another aspect, a computer system includes one or more processors, one or more computer-readable memories, and one or more computer-readable storage mediums. The computer system further includes program instructions, stored on at least one of the one or more storage devices for execution by at least one of the one or more processors via at least one of the one or more memories, to evaluate content entered into a file. The computer system further includes program instructions, stored on at least one of the one or more storage devices for execution by at least one of the one or more processors via at least one of the one or more memories, to detect a starting delimiter and a stopping delimiter in the file. The computer system further includes program instructions, stored on at least one of the one or more storage devices for execution by at least one of the one or more processors via at least one of the one or more memories, to copy a first portion of the file outside the starting delimiter and the stopping delimiter to a repository, and refrain from copying a second portion of the file inside the starting delimiter and the stopping delimiter to the repository.

The details of one or more embodiments of the invention are set forth in the accompanying drawings and the description below. Other features, objects, and advantages of the invention will be apparent from the description and drawings, and from the claims.

DETAILED DESCRIPTION

Various examples are disclosed herein for techniques, methods, and systems generally directed to version control with selectable file portion synchronization between an IDE and a repository, so that a version control system of this disclosure either synchronizes or ignores different portions of a file during synchronization, in accordance with user selections. For example, a version control system of this disclosure may enable user selection instructions to be inserted in source code comments so they do not affect the source code, but may still be read and interpreted by the version control system, as an instruction to either include or exclude the user-selected portion of the source code file in a version synchronization between the user's IDE and a shared repository.

As a particular example, a user may enter sensitive content such as passwords within a portion of the user's own version of a source code file, within instructions for a version control system of this disclosure to omit only the selected portion of the file with the sensitive content from the version control synchronization. The user may then freely share the file version in the shared repository with others via the version control system, with all of the user's updates to the file automatically synchronized, except for the user-selected portion of the file containing the sensitive content, which remains private to the user's own version of the file in the user's IDE (and potentially, with a private repository). Other features and advantages of the disclosure are apparent from the accompanying figures and the description below.

Figure 1:
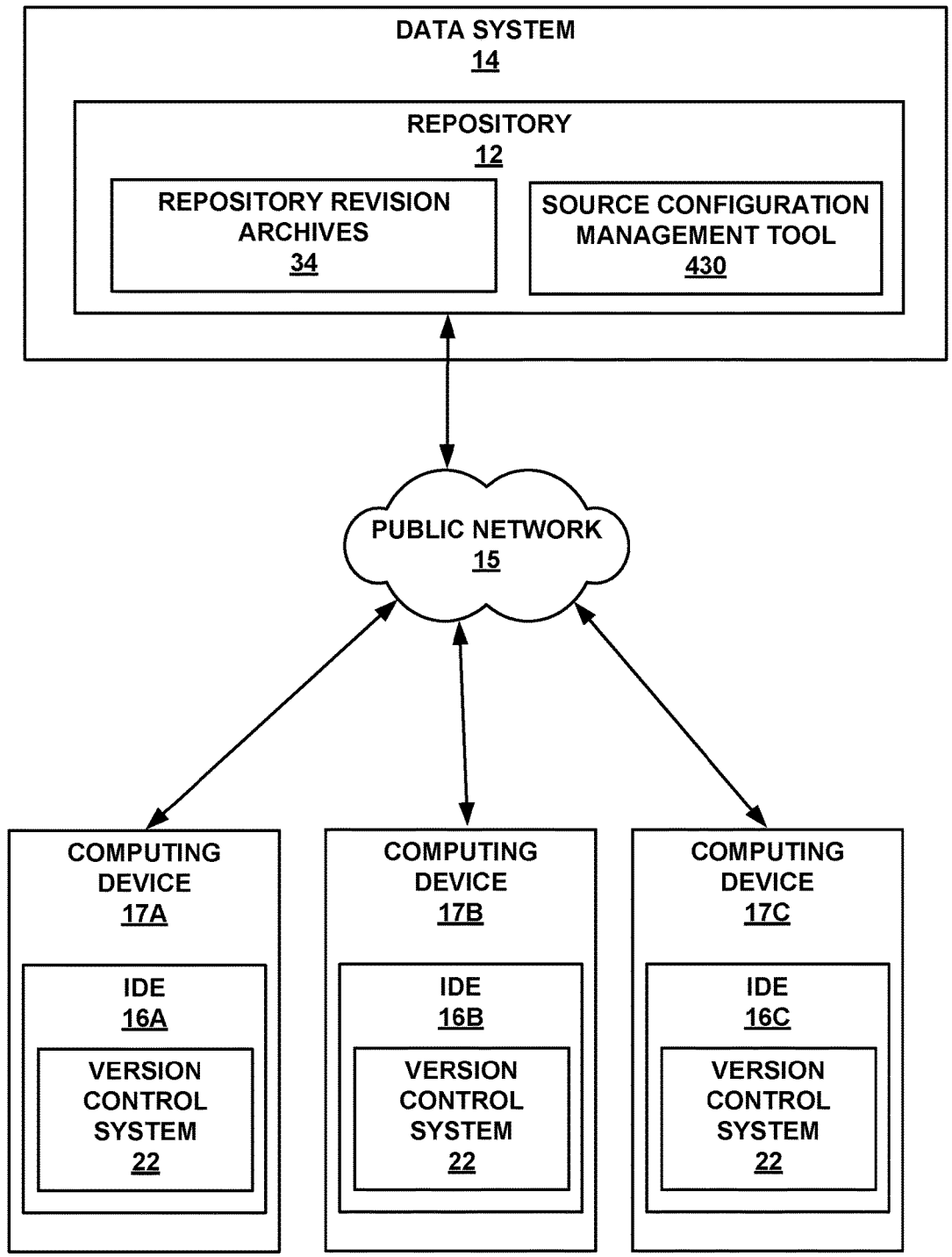
FIG. 1 depicts a conceptual block diagram of a plurality of client computing devices, each hosting a respective integrated development environment (IDE), where each of the IDEs includes a respective copy of a version control system of this disclosure, and is in at least intermittent operative communication with a shared file repository hosted in a data system, in one aspect of this disclosure.

FIG. 1 depicts a conceptual block diagram of a plurality of client computing devices 17A, 17B, 17C ("computing device 17"), each hosting a respective integrated development environment (IDE) 16A, 16B, 16C ("IDEs 16"). Each of IDEs 16 includes a respective copy of a version control system 22 of this disclosure, and is in at least intermittent operative communication with a shared file repository 12 ("repository 12") hosted in a data system 14, in one aspect of this disclosure. Version control system 22 on IDEs 16 is configured to enable user-selectable file portion inclusion or exclusion in file version synchronization with shared file repository 12. In various examples, a standalone application and/or in a plug-in or add-on to version control system 22 may manage or enable user-selectable file portion inclusion or exclusion in file version synchronization with shared file repository 12, and other techniques described herein.

IDEs 16 may each be installed on or comprised in a respective client computing device 17, which may be implemented as a laptop computer, a desktop computer, a tablet computer, or any other type of device capable of implementing IDE 16. Data system 14 may include one or more servers, one or more data centers, or one or more of any type of computing device capable of operably communicating with IDEs 16 and hosting and executing repository 12. Data system 14 may be either local to one or more of IDEs 16 or geographically spread out, potentially anywhere in the world.

Computing devices 17 may be connected via a network 15, such as the Internet, to repository 12, which may be included in data system 14. Repository 12 may include repository revision archives 34 and a source configuration management tool 430 in this example.

Figure 2:
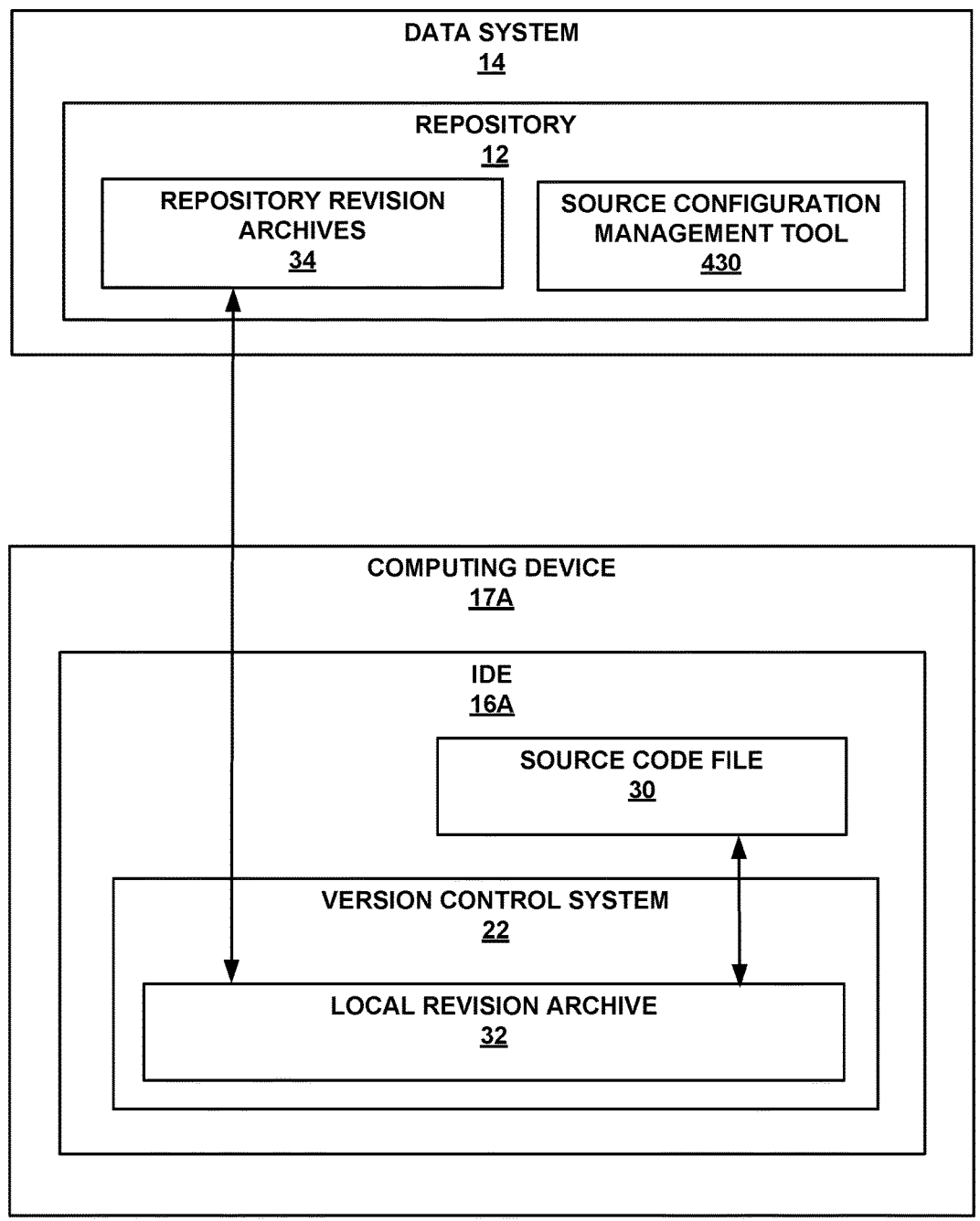
FIG. 2 depicts a representative client computing device hosting an IDE that includes a version control system, in one aspect of this disclosure.

FIG. 2 depicts a representative client computing device 17A hosting IDE 16A including version control system 22, in one aspect of this disclosure. Computing device 17A has a local copy of a source code file 30 and a local revision archive 32 of source code file 30 both stored and/or loaded on computing device 17A, where revision archive 32 is managed by version control system 22, in one aspect of this disclosure. Computing device 17A is in operative communication with repository 12 in data system 14. Version control system 22 may store revision archive 32 of source code file 30 on computing device 17A, and synchronize portions of revision archive 32 with repository 12 in data system 14, in response to user inputs to insert synchronization delimiters into source code file 30.

Figure 3:
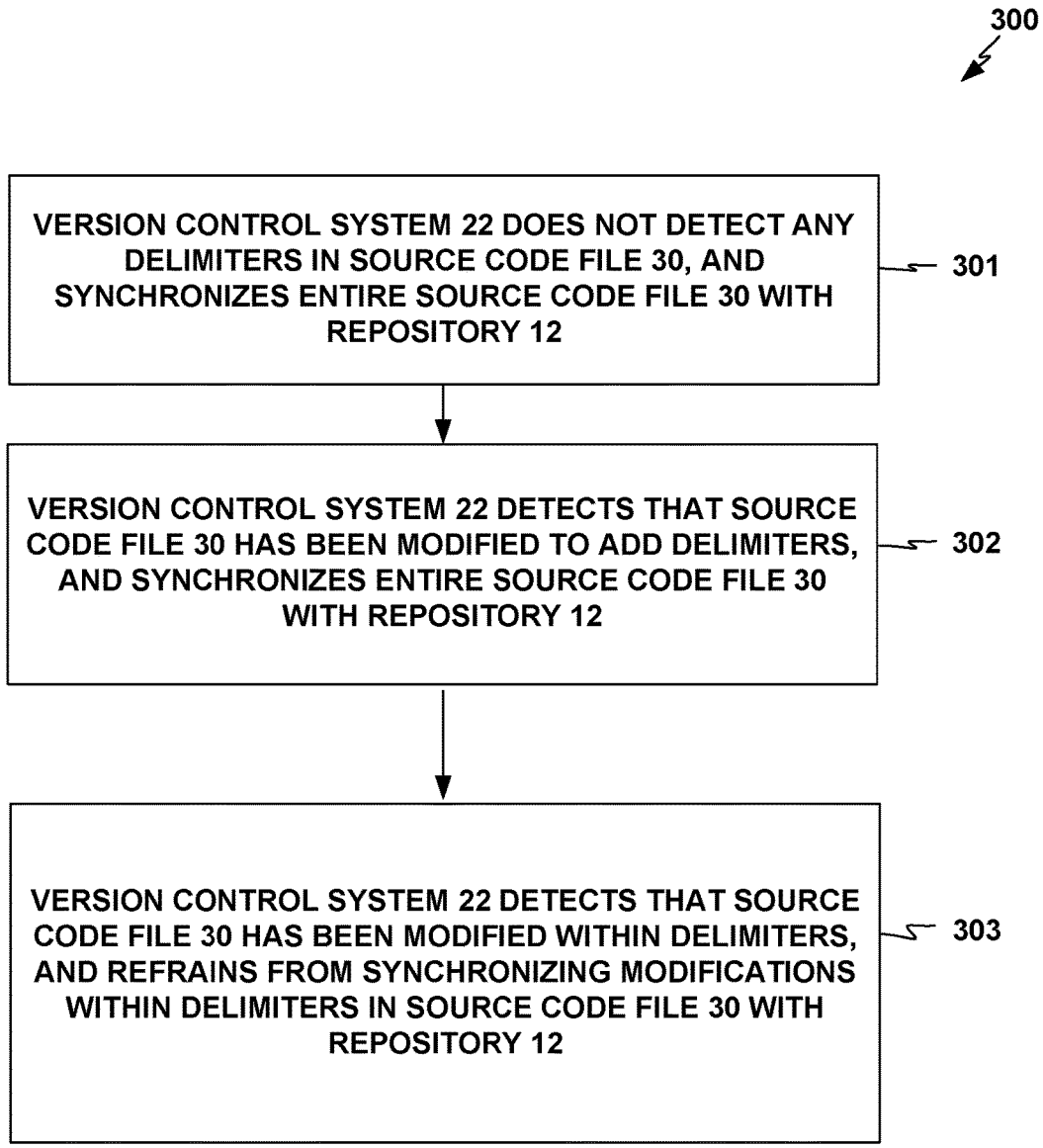
FIG. 3 depicts a conceptual block diagram of a process of version control system synchronizing portions of a revision archive with a repository, in one aspect of this disclosure.

FIG. 3 depicts a conceptual block diagram of a process 300 of version control system 22 synchronizing portions of revision archive 32 with repository 12, in one aspect of this disclosure. Version control system 22 synchronizing local source code file 30 with a repository file version on repository 12 may include version control system 22 checking local source code file 30 for any inserted delimiters. If version control system 22 does not detect any inserted delimiters, version control system 22 may, in response, synchronize the entire local source code file 30 with repository 12 (301). A user may then insert starting and ending delimiters in source code file 30. Version control system 22 may detect that source code file 30 has been changed, with the insertion of the delimiters, and may synchronize local source code file 30 with repository 12, to include the delimiters, but without changing any content in the portion of source code file 30 bounded by the delimiters (302). The user may then make modifications to the portion of source code file 30 bounded by the delimiters; version control system 22 may detect that there are no changes made outside of the portion of source code bounded by the delimiters, and so may refrain from making any new synchronization changes to the revision archive for source code file 30 in repository 12 (303).

Figure 4:
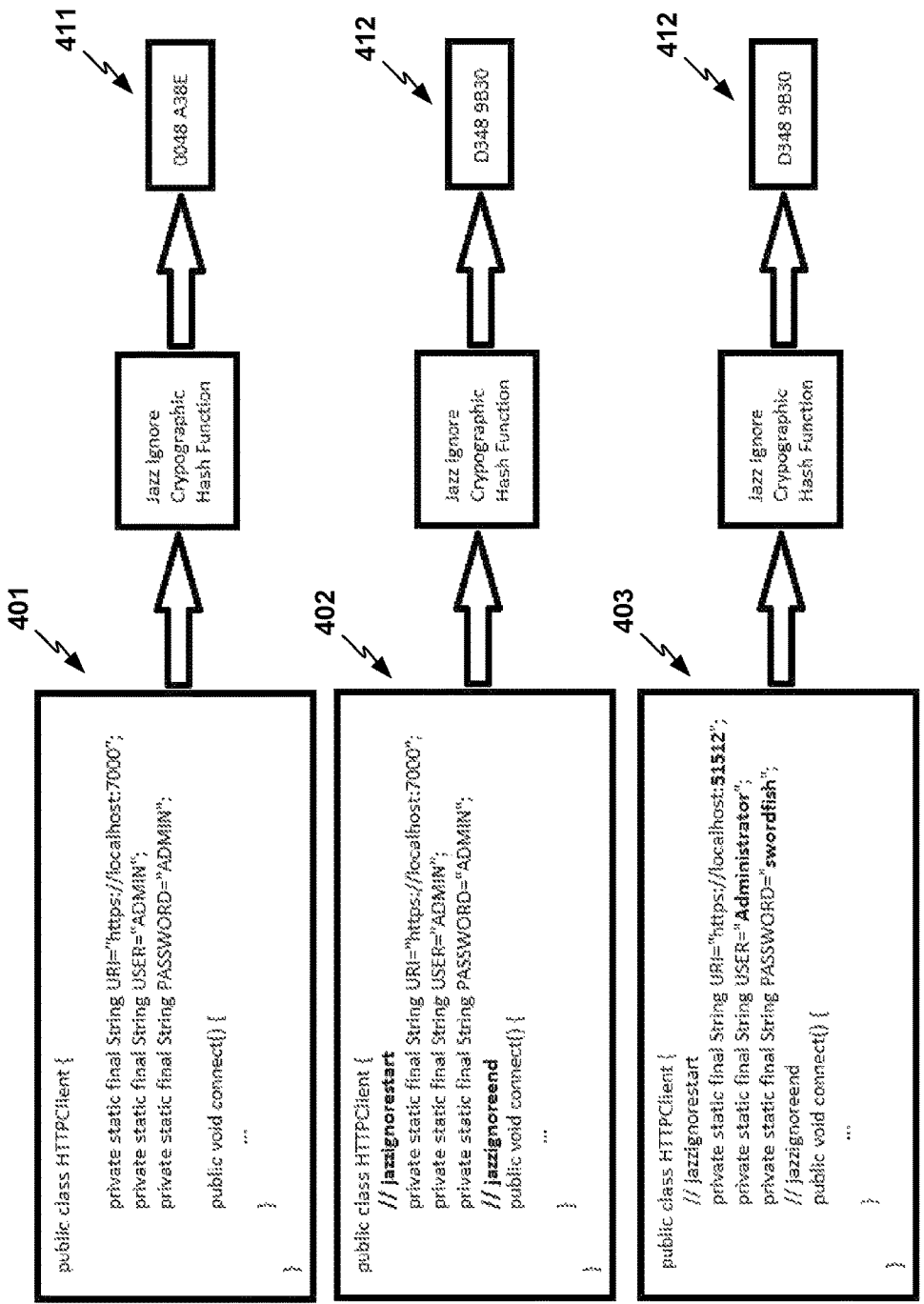
FIG. 4 depicts a conceptual block diagram with additional detail corresponding to the process depicted in FIG. 3, in one aspect of this disclosure.

FIG. 4 depicts a conceptual block diagram with additional detail corresponding to process 300 depicted in FIG. 3, in one aspect of this disclosure. In the example of FIG. 4, version control system 22 may apply a hash value to each version (or corresponding revision tracking file, e.g., difference file/diff file) of local source code file 30 as version control system 22 stores the versions in a revision archive in repository 12. Version control tool 22 may use cryptographic hash functions to compare the contents of the different file versions. Version control system 22 may make exceptions and refrain from applying a new hash value for revisions made only within a code portion bounded by synchronization exception delimiters. As shown in FIG. 4, version control system 22 may generate a hash value 411 corresponding to code portion 401, as a representative portion of source code file 30. A user may then add synchronization delimiters to the code portion, as in code portion 402, and version control system 22 may generate a hash value 412 corresponding to code portion 402 containing the newly added delimiters. The user may then modify the content within the bounds of the delimiters, as in code portion 403. Version control system 22 may detect the changes within the bounds of the delimiters, and may detect that only the code portion within the delimiters has been modified, and so may refrain from generating a new diff file or corresponding new hash value, and instead maintain hash value 412, which maintains its correspondence to code portion 402.

Thus, version control system 22 may ignore all text between a starting delimiter (e.g., "jazzignore-start") and an ending delimiter (e.g., "jazzignore-end"). In this way, a user may modify the text in between the starting and ending delimiters and not have to worry about accidentally synchronizing or checking in a new source code version with the text between the starting delimeter and the ending delimeter into repository 12. This synchronization avoidance may be valuable, for example, if a source code file has constants defined for values of Uniform Resource Indicator (URI), USER, and/or PASSWORD. In the example of FIG. 4, the initial version of a portion of source code 401 may appear as follows:

```
public class HTTPClient {
    private static final String URI="https://localhost:7000";
    private static final String USER="ADMIN";
    private static final String PASSWORD="ADMIN";
    public void connect( ) {
        ...
    }
}
```

The user may then insert a starting delimiter and an ending delimiter into this source code portion, as shown in source code portion 402. In different examples, a user may insert a starting delimiter and an ending delimiter into this source code portion by manually selecting the appropriate positions and manually typing the text as shown, or by selecting the positions and selecting inputs provided by the IDE for automated insertion of the appropriate starting and ending delimiters, for example. The modified source code portion with starting delimiter ("jazzignorestart" in this example) and ending delimiter ("jazzignoreend" in this example) inserted may appear as follows:

```
public class HTTPClient {
    // jazzignorestart
    private static final String URI="https://localhost:7000";
    private static final String USER="ADMIN";
    private static final String PASSWORD="ADMIN";
    // jazzignoreend
    public void connect( ) {
        ...
    }
}
```

As shown above, the starting and ending delimiters are commented out of the source code, by being inserted after the double forward slash comment syntax "//" defining the beginning of a single-line comment in Java as well as in languages such as C, C++, and JavaScript® that may be used in other examples of this disclosure. In other examples, version control system 22 may recognize and detect delimiters inserted in commented-out sections of source code in comment syntax appropriate to those other languages, such as within quote signs in Smalltalk, after a hash symbol in Python® or Ruby, or after a semicolon in Common Lisp or Clojure. In any of these and other examples, the delimiters inserted in code portions that are appropriately commented out of the interpreted or compiled code in accordance with the language's syntax are ignored by the interpreter or compiler, but may be detected by version control system 22.

With the delimiters in place, the user may then modify the source code or other content between the bounds defined by the delimiters, with the modified content ignored by version control system 22 for purposes of synchronization. For example, the user may modify the URI, the user name, and/or the password defined in the source code, as in the following example:

```
public class HTTPClient {
    // jazzignorestart
    private static final String URI="https://localhost:5152";
    private static final String USER="Administrator";
    private static final String PASSWORD="Swordfish242";
    // jazzignoreend
    public void connect( ) {
        ...
    }
}
```

Thus, version control system 22 may enable the user to freely modify these constant values and not accidentally share them with the user's team or with an open source community in a new file version in the repository. The user may, however, update the content by first committing a version of the file without the start and end delimiters, then committing changes to the text, and finally committing the start and end delimiters back. Version control system 22 of this disclosure may thus remove a need for users to manually manage separate file versions for a working file with desired values for private content such as passwords, user names, and URIs, and a public file for sharing.

Repository 12 may also include source configuration management tool 430 that may manage access to the stored versions of source code file 30 in revision archive 34 of source code file 30 in repository 12. Source configuration management tool 430 may compare two file version contents' hash values to decide if the file has changed or not. As shown in FIG. 4, source code portion 401 has a hash value 411 of "0048 A38E." Source code portion 402, after addition of the start and end delimiters, has a hash value 412 of "D348 9B30." Source code portion 403 represents a subsequent revision after the version recorded as source code portion 402, with modified text between the start and end delimiters, but does not have a separate hash value from hash value 412 associated with source code portion 402. Source configuration management tool 430 may thus ignore source code portion 403, and thus refrain from providing general or shared access to source code portion 403 to general users of repository 12. In various examples, version control system 22 may refrain from synchronizing or communicating any of the code or data between the start and end delimiters to repository 12, while in various examples, version control system 22 may synchronize code or data between the start and end delimiters to repository 12, and source configuration management tool 430 may omit the code or data between the start and end delimiters in versions made available to general users of repository 12, as further described below.

Thus, in various examples, version control system 22 may evaluate content entered into source code file 30, and detect the starting delimiter and the stopping delimiter in source code file 30, e.g., the starting delimiter "jazzignorestart" and the stopping delimiter "jazzignoreend" in commented-out lines of source code file 30. Version control system 22 may then copy a first portion of source code file 30, i.e., the one or more portions of source code file 30 outside the starting delimiter and the stopping delimiter, to repository 12, while version control system 22 refrains from copying a second portion of the file, i.e., the one or more portions of source code file 30 inside or between the starting delimiter and the stopping delimiter, to repository 12.

Source configuration management tool 430 may also manage merging changes between file versions in repository 12. For merging, source configuration management tool 430 may identify the start and end delimiters in both versions of the file contents (e.g., source code portions 402 and 403), and merge different versions of the file, while excluding any differences identified in between the starting and stopping delimiters from the merged file. Thus, the merged file may include the starting and stopping delimiters, and content in between the starting and stopping delimiters as it was when the starting and stopping delimiters were first inserted, without including any modifications made by the user after the starting and stopping delimiters were inserted. Source configuration management tool 430 may identify and merge different versions of the file from different forks or branches of the file in the repository. Source configuration management tool 430 may also generate forked versions of the file in response to inputs to create forked versions of the file from other users besides the creator of the file, such that the forked versions of the file also omit any modifications to the content between the delimiters from after the delimiters were inserted. In various examples, version control system 22 on a user's local computing device 17A may also include a source configuration management tool and may manage merging changes between file versions from the local computing device 17A and/or from repository 12, and may merge different versions of a file, while excluding any differences identified in between the starting and stopping delimiters from the merged file as synchronized to repository 12. In various examples, version control system 22 may enable or embody any of the functions described with respect to source configuration management tool 430.

In various examples, version control system 22 may maintain user modifications to the file portion bounded by the delimiters only on a local revision archive, such as on the user's local computing device, without backing up any content from within the file portion bounded by the delimiters to the revision archive in the repository. In these examples, there is no need for version control system 22 to generate a different hash value for a file revision to the file portion within the delimiters because version control system 22 never sends the modified file portion content within the delimiters to repository 12. Version control system 22 may maintain the local revision history in local device memory and/or data storage on the user's computing device, and/or in a local detached data storage device, a local redundant array of independent discs (RAID) storage system, or other local storage system, so that the user's revision history is still backed up outside of the user's local computing device.

In various examples, version control system 22 may be used to back up and synchronize text files, word processing files, spreadsheets, database or data store files, slide deck files, template files, publishing files, web page files, or any other type of content files, and starting and stopping delimiters may be used in the files of whatever type to impose synchronization avoidance on the portions of the files bounded by the delimiters. In various examples, multiple sets of starting and stopping delimiters may be used in different portions of a single source code file or other type of file, and version control system 22 may refrain from synchronizing the multiple portions of the files bounded by multiple sets of starting and stopping delimiters. If two or more starting delimiters are inadvertently inserted in sequence before a stopping delimiter, version control system 22 may ignore the second or additional starting delimiters as it would ignore any other content within the bounds of the first starting delimiter and the subsequent stopping delimiter for purposes of synchronization avoidance.

In various examples, any string or other character set may be used as a starting delimiter, and any string or other character set may be used as a stopping delimiter. In some examples involving source code, starting and stopping delimiters may be defined to be the same as certain elements of uncommented source code, such as a set of source code defining a password. As one example, a character set in Java of "private static final String PASSWORD" or other character set may be defined to be a starting delimiter, and the subsequent semicolon, ";" may be defined as a stopping delimiter. In this example, a conforming line of source code defining a password is automatically exempted from synchronization without the user having to take any further manual steps to insert starting and stopping delimiters.

In some examples, the starting and stopping delimiters may be defined separately from source code, and version control system 22 may automatically detect a set of syntax defining sensitive content such as a password, after the user has typed the set of syntax in the IDE, and version control system 22 may automatically insert starting and stopping delimiters around at least the one line of code defining the password or other sensitive content. As an example based on Java, version control system 22 may detect a line of code beginning with "private static final String PASSWORD" and may automatically insert commented-out delimiters such as "// jazzignorestart" and "// jazzignoreend" before and after the line defining the password. In some examples, version control system 22 may then refrain from again automatically adding those delimiters around that detected sensitive content line if the user subsequently manually modifies the delimiters, such as to move one or both of the delimiters up or down to include additional lines of code within the bounds of the delimiters.

Figure 5:
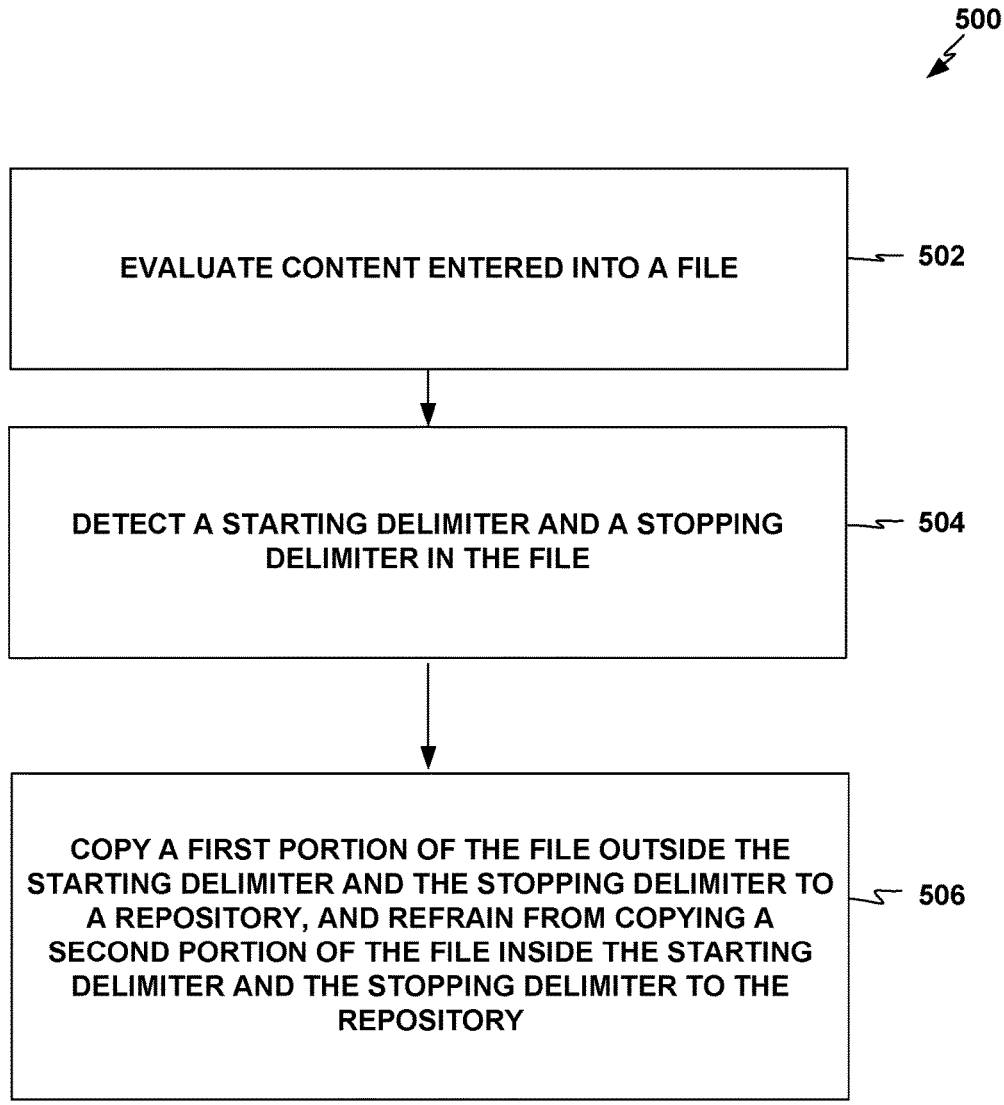
FIG. 5 depicts a flowchart of an example process that a version control system, executing on one or more computing devices (e.g., servers, computers, processors, etc.), may perform, in one aspect of this disclosure.

FIG. 5 depicts a flowchart of an example process 500 that version control system 22, a standalone application, and/or in a plug-in or add-on to version control system 22 that enables user-selectable file portion inclusion or exclusion in file version synchronization and other techniques described herein, executing on one or more computing devices (e.g., servers, computers, processors, etc.), may perform, in one aspect of this disclosure. Process 500 may include evaluating content entered into a file (502) (e.g., version control system 22 evaluating source code file 30 as described above). Process 500 may further include detecting a starting delimiter and a stopping delimiter in the file (504) (e.g., version control system 22 detecting a starting delimiter and a stopping delimiter in source code file 30 as described above). Process 500 may further include copying a first portion of the file outside the starting delimiter and the stopping delimiter to a repository, and refraining from copying a second portion of the file inside the starting delimiter and the stopping delimiter to the repository (506) (e.g., version control system 22 copying the portions of source code file 30 outside of the starting and stopping delimiters to a data back-up such as repository 12, and version control system 22 refraining from copying the portion of source code file 30 inside of or between the starting and stopping delimiters to the data back-up such as repository 12, as described above). Various implementations of process 500 may also include any of the processes described above.

Figure 6:
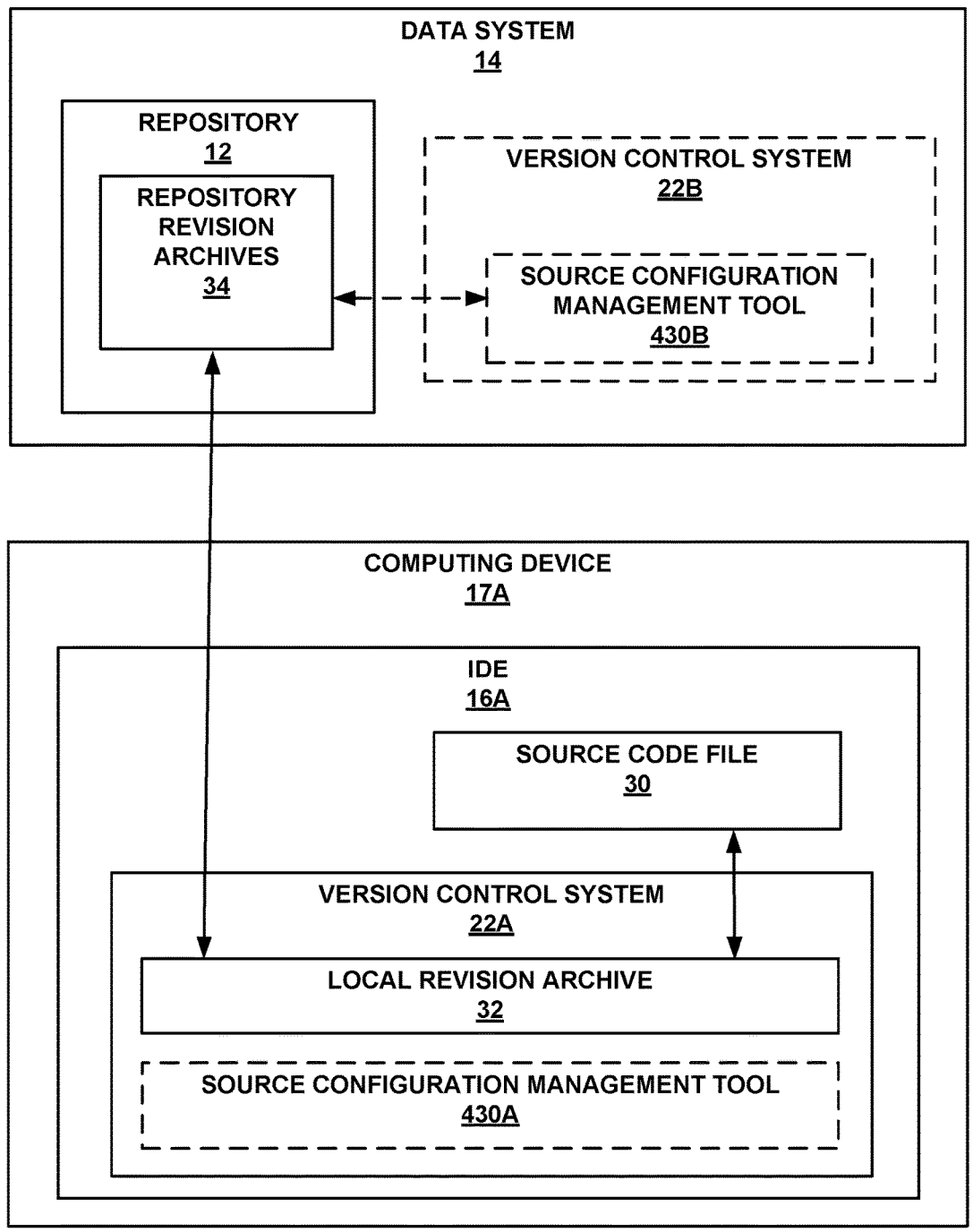
FIG. 6 depicts a representative client computing device hosting an IDE with a version control system that may include a source configuration management tool, and/or that my interact with a version control system hosted at a data system that may include a source configuration management tool, in various aspects of this disclosure.

FIG. 6 depicts a representative client computing device 17B hosting IDE 16A with a version control system 22A that may include a source configuration management tool 430A, and/or that my interact with a version control system 22B hosted at data system 14 that may include a source configuration management tool 430B, in various aspects of this disclosure. Computing device 17B may have a local copy of a source code file 30 and a local revision archive 32 of source code file 30 both stored and/or loaded on computing device 17B, where revision archive 32 is managed by version control system 22A, in one aspect of this disclosure. Computing device 17B is in operative communication with repository 12 in data system 14. Version control system 22A may store revision archive 32 of source code file 30 on computing device 17B, and synchronize portions of revision archive 32 with repository 12 in data system 14, in response to user inputs to insert synchronization delimiters into source code file 30.

Version control system 22A may include source configuration management tool 430A, which in some examples may perform tasks such as generating hash values for different modifications of the file and communicating those hash values to repository revision archive 34 for the file in repository 12. Source configuration management tool 430A may generate hash values in repository revision archive 34 in association with each of one or more modifications to the first portion of the file outside the starting delimiter and the stopping delimiter, and refrain from generating hash values in association with one or more modifications to the second portion of the file inside the starting delimiter and the stopping delimiter, as described above.

In some examples, source configuration management tool 430A of version control system 22A may perform merging the first portion of the file outside the starting delimiter and the stopping delimiter with a second version of the file in local revision archive 32 to be communicated to repository revision archives 34 in repository 12. As part of this function, source configuration management tool 430A may refrain from merging the second portion of the file inside the starting delimiter and the stopping delimiter with the second version of the file in local revision archive 32 to be communicated to repository revision archives 34 in repository 12.

In some examples, version control system 22B hosted and/or executing at data system 14 may perform at least some of the functions described above. For example, source configuration management tool 430B may generate, in repository revision archives 34 for the file in repository 12, hash values in association with each of one or more modifications to the first portion of the file outside the starting delimiter and the stopping delimiter, and refrain from generating hash values in association with one or more modifications to the second portion of the file inside the starting delimiter and the stopping delimiter. Source configuration management tool 430B may also, in some examples, provide access to the revision archive for the file in repository revision archives 34 (e.g., to other users besides the user of computing device 17B) via the hash values, such that the access does not include access to the one or more modifications to the second portion of the file inside the starting delimiter and the stopping delimiter.

In some examples, source configuration management tool 430B of version control system 22B at data system 14 may perform merging the first portion of the file outside the starting delimiter and the stopping delimiter with a second version of the file in repository revision archives 34 in repository 12, e.g., after version control system 22A communicates the modification versions of the file to data system 14, as part of initially storing the modification versions of the file to repository revision archives 34. As part of this function, source configuration management tool 430B may refrain from merging the second portion of the file inside the starting delimiter and the stopping delimiter with the second version of the file in repository revision archives 34 in repository 12.

Figure 7:
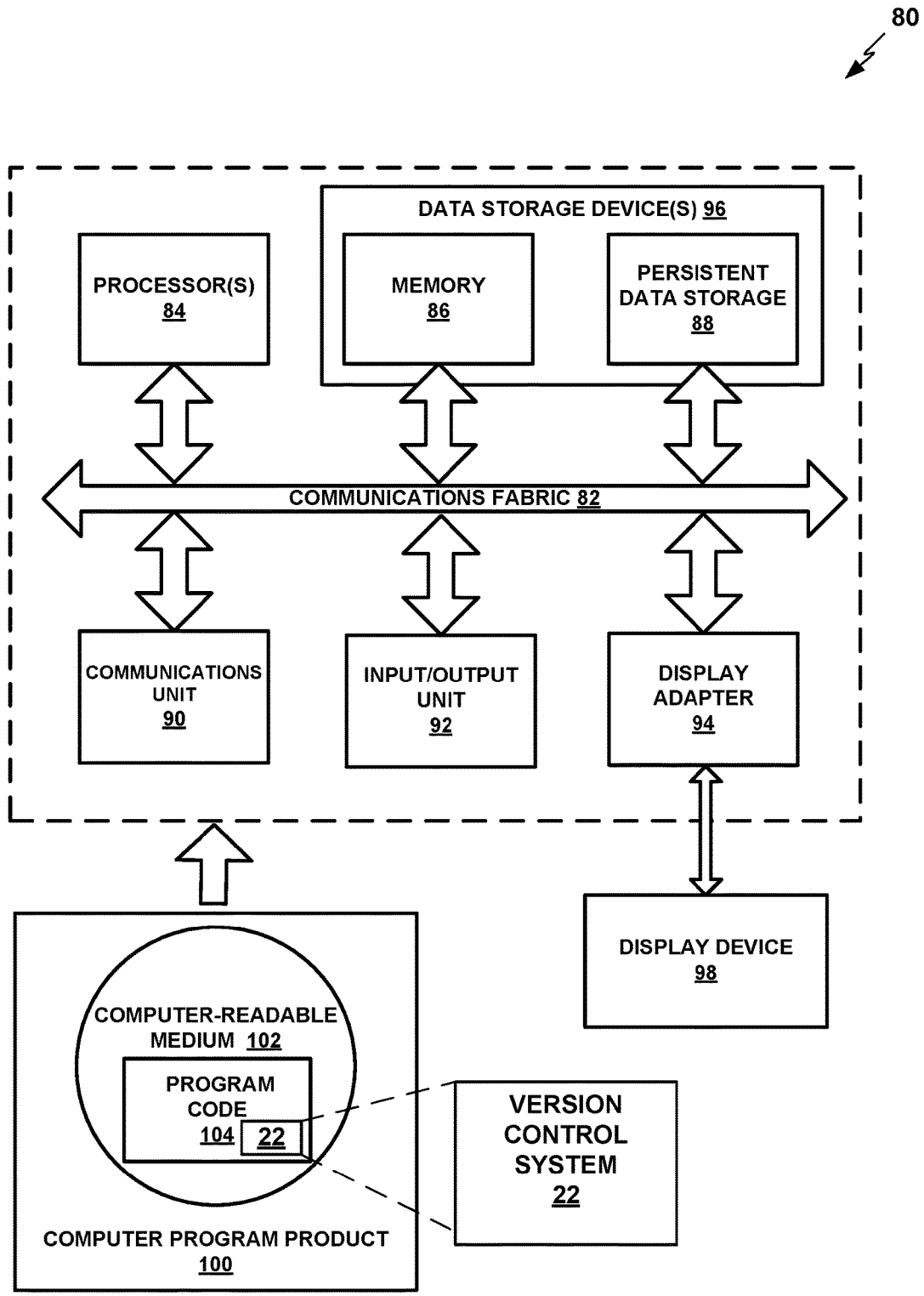
FIG. 7 is a block diagram of a computing device that may be used to execute a version control system, in one aspect of this disclosure.

FIG. 7 is a block diagram of a computing device 80 that may be used to execute a version control system 22, or a standalone application and/or in a plug-in or add-on to version control system 22 that enables user-selectable file portion inclusion or exclusion in file version synchronization with shared file repository 12 and other techniques described herein, in various aspects of this disclosure. Computing device 80 may be a laptop computer, desktop computer, or any other type of client computing device such as one of computing devices 17 as depicted in FIGS. 1 and 2. Computing device 80 may also be a server in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer or device having capabilities or formats other than or beyond those described herein.

In the illustrative example of FIG. 7, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage mediums. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical computer-readable data storage devices. Data storage 96 may include any of various forms of volatile memory that may require being periodically electrically refreshed to maintain data in memory, while those skilled in the art will recognize that this also constitutes an example of a physical computer-readable data storage device. Executable instructions may be stored on a physical medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for a version control system 22, as described in greater detail above. This program code may be stored on memory 86, persistent data storage 88, or elsewhere in computing device 80. This program code may also take the form of program code 104 stored on computer-readable medium 102 included in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which includes a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 including computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over mediums, such as communications links or wireless transmissions containing the program code 104. Program code 104 may be more or less temporarily or durably stored on any number of intermediate physical computer-readable devices and mediums, such as any number of physical buffers, caches, main memory, or data storage components of servers, gateways, network nodes, mobility management entities, or other network assets, en route from its original source medium to computing device 80.

The present invention may be a system, a method, and/or a computer program product at any possible technical detail level of integration. The computer program product may include a computer readable storage medium (or mediums) having computer readable program instructions thereon for causing a processor to carry out aspects of the present invention.

The computer readable storage medium may be a device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission mediums (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising: evaluating, with one or more processing devices, content entered into a source code file; detecting, with the one or more processing devices, a starting delimiter and a stopping delimiter in the source code file; generating a hash value from a cryptographic hash of a first portion of the source code file, and refraining from generating the hash value based on a second portion of the source code file that is positioned between the starting delimiter and the stopping delimiter, wherein the first portion of the source code file comprises source code that positioned before the starting delimiter and source code that is positioned after the stopping delimiter, wherein the second portion of the source code file that is positioned between the starting delimiter and the stopping delimiter comprises sensitive data, the sensitive data comprising at least one of username data, password data, or configuration data; determining that the hash value and a previously generated hash value from an earlier version of the source code file are different; and responsive to determining that the hash value and the previously generated hash value are different, copying, with the one or more processing devices, the first portion of the source code file to a repository, and refraining from copying the second portion of the source code file to the repository, wherein refraining from copying the second portion of the source code file comprises refraining from copying the sensitive data so as not to store the sensitive data in the repository.

2. The method of claim 1, wherein the source code file comprises source code in a programming language with a defined syntax for commenting out portions of source code, and wherein evaluating the content entered into the source code the comprises evaluating content within portions of the source code file that are commented out in accordance with the syntax for commenting out portions of source code defined for the programming language, wherein detecting the starting delimiter and the stopping delimiter in the source code file comprises detecting the starting delimiter and the stopping delimiter within portions of the source code the that are commented out in accordance with the syntax for commenting out portions of source code defined for the programming language.

3. The method of claim 1, wherein copying the first portion of the source code file to the repository comprises synchronizing the first portion of the source code file with a revision archive of the source code file in the repository.

4. The method of claim 1, further comprising: providing access to a revision archive for the source code the in the repository via the hash values, such that the access does not include access to the one or more modifications to the second portion of the source code file.

5. The method of claim 1, further comprising merging the first portion of the source code file with a second version of the source code file in the repository, and refraining from merging the second portion of the source code file with the second version of the source code file in the repository.

6. A computer program product comprising a computer-readable storage medium having program code embodied therewith, the program code executable by a computing device to: evaluate content entered into a source code file; detect a starting delimiter and a stopping delimiter in the source code file; generate a hash value from a cryptographic hash of a first portion of the source code file, and refrain from generating the hash value based on a second portion of the source code file that is positioned between the starting delimiter and the stopping delimiter, wherein the first portion of the source code file comprises source code that positioned before the starting delimiter and source code that is positioned after the stopping delimiter, wherein the second portion of the source code file that is positioned between the starting delimiter and the stopping delimiter comprises sensitive data, the sensitive data comprising at least one of username data, password data, or configuration data; determine that the hash value and a previously generated hash value from an earlier version of the source code file are different; and responsive to determining that the hash value and the previously generated hash value are different, copy the first portion of the source code file to a repository, and refrain from copying the second portion of the source code file to the repository, wherein refraining from copying the second portion of the source code file comprises refraining from copying the sensitive data so as not to store the sensitive data in the repository.

7. The computer program product of claim 6, wherein the source code file comprises source code in a programming language with a defined syntax for commenting out portions of source code, and wherein the program code executable to evaluate the content entered into the source code file comprises program code executable to evaluate content within portions of the source code file that are commented out in accordance with the syntax for commenting out portions of source code defined for the programming language, wherein detecting the starting delimiter and the stopping delimiter in the source code file comprises detecting the starting delimiter and the stopping delimiter within portions of the source code file that are commented out in accordance with the syntax for commenting out portions of source code defined for the programming language.

8. The computer program product of claim 6, wherein the program code executable to copy the first portion of the source code file to the repository comprises program code executable to synchronize the first portion of the source code file with a revision archive of the source code file in the repository.

9. The computer program product of claim 6, wherein the embodied program code is further executable by the computing device to: provide access to the revision archive for the source code file in the repository via the hash values, such that the access does not include access to the one or more modifications to the second portion of the source code file.

10. The computer program product of claim 6, wherein the embodied program code is further executable by the computing device to: merge the first portion of the source code file with a second version of the source code file in the repository; and refrain from merging the second portion of the source code file with the second version of the source code file in the repository.

11. A computer system comprising: one or more processors, one or more computer-readable memories, and one or more computer-readable storage mediums; program instructions, stored on at least one of the one or more storage devices for execution by at least one of the one or more processors via at least one of the one or more memories, to evaluate content entered into a source code tile; program instructions, stored on at least one of the one or more storage devices for execution by at least one of the one or more processors via at least one of the one or more memories, to detect a starting delimiter and a stopping delimiter in the source code file; program instructions, stored on at least one of the one or more storage devices for execution by at least one of the one or more processors via at least one of the one or more memories, to generate a hash value from a cryptographic hash of a first portion of the source code file, and refrain from generating the hash value based on a second portion of the source code file that is positioned between the starting delimiter and the stopping delimiter, wherein the first portion of the source code file comprises source code that positioned before the starting delimiter and source code that is positioned after the stopping delimiter, wherein the second portion of the source code file that is positioned between the starting delimiter and the stopping delimiter comprises sensitive data, the sensitive data comprising at least one of username data, password data, or configuration data; program instructions, stored on at least one of the one or more storage devices for execution by at least one of the one or more processors via at least one of the one or more memories, to determine that the hash value and a previously generated hash value from an earlier version of the source code file are different; program instructions, stored on at least one of the one or more storage devices for execution by at least one of the one or more processors via at least one of the one or more memories, to, responsive to determining that the hash value and the previously generated hash value are different, copy the first portion of the source code file to a repository, and refraining from copying the second portion of the source code file to the repository, wherein refraining from copying the second portion of the source code file comprises refraining from copying the sensitive data so as not to store the sensitive data in the repository.

12. The computer system of claim 11, wherein the source code file comprises source code in a programming language with a defined syntax for commenting out portions of source code, and wherein the program instructions to evaluate the content entered into the source code file comprise program instructions to evaluate content within portions of the source code file that are commented out in accordance with the syntax for commenting out portions of source code defined for the programming language, wherein detecting the starting delimiter and the stopping delimiter in the source code file comprises detecting the starting delimiter and the stopping delimiter within portions of the source code file that are commented out in accordance with the syntax for commenting out portions of source code defined for the programming language.

13. The computer system of claim 11, wherein the program instructions to copy the first portion of the source code file to the repository comprise program instructions to synchronize the first portion of the source code file with a revision archive of the source code file in the repository.

14. The computer system of claim 11, further comprising: program instructions, stored on at least one of the one or more storage devices for execution by at least one of the one or more processors via at least one of the one or more memories, to provide access to the revision archive for the source code the in the repository via the hash values, such that the access does not include access to the one or more modifications to the second portion of the source code file.

15. The computer system of claim 11, further comprising: program instructions, stored on at least one of the one or more storage devices for execution by at least one of the one or more processors via at least one of the one or more memories, to merge the first portion of the source code with a second version of the source code the in the repository; and program instructions, stored on at least one of the one or more storage devices for execution by at least one of the one or more processors via at least one of the one or more memories, to refrain from merging the second portion of the source code file with the second version of the source code file in the repository.

* * * * *